July 6, 1943.  R. M. SHERMAN  2,323,627
LIQUID METERING DEVICE
Filed Feb. 3, 1940  2 Sheets-Sheet 1

Inventor:
Ralston M. Sherman

July 6, 1943.  R. M. SHERMAN  2,323,627
LIQUID METERING DEVICE
Filed Feb. 3, 1940  2 Sheets-Sheet 2
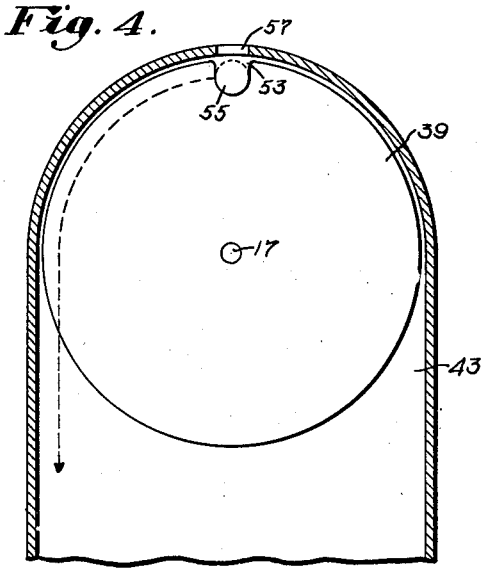
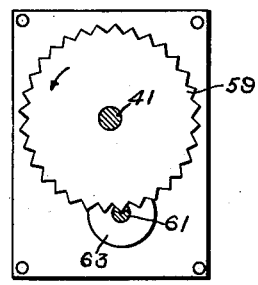
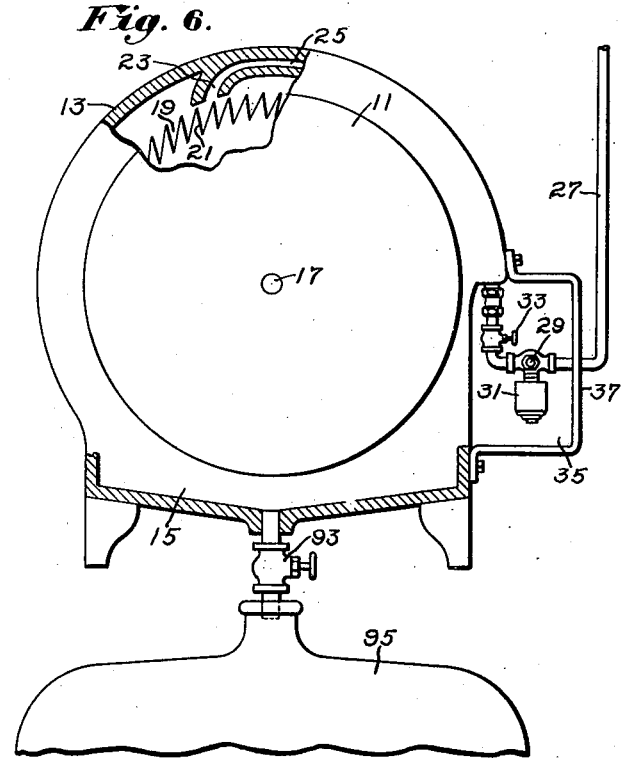
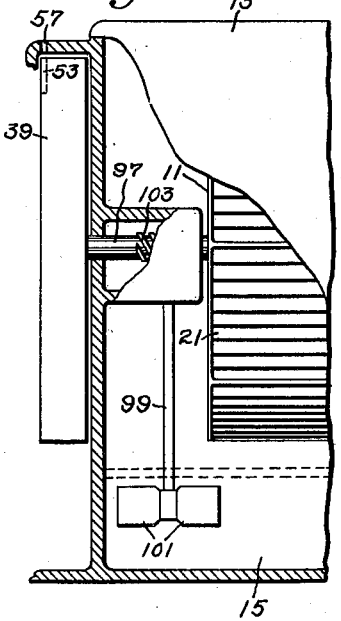
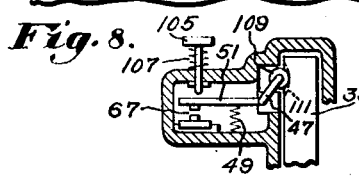
Inventor:
Railston M. Sherman,
Attys.

Patented July 6, 1943

2,323,627

UNITED STATES PATENT OFFICE 2,323,627

LIQUID METERING DEVICE

Rallston M. Sherman, Glastonbury, Conn.

Application February 3, 1940, Serial No. 317,165

12 Claims. (Cl. 221—101)

This invention relates to liquid metering devices and particularly, though not exclusively, to those devices to be used for the metering of liquid fuel, such as oil.

One object of the invention is to provide a liquid meter of compact form and of relatively inexpensive construction, capable of accurately metering a given quantity of liquid when started into operation by any means, as by the insertion of a coin.

Another object is to provide electro-magnetically controlling means for the simplified construction and control of such a meter.

Another object is to provide a metering device so combined with a liquid fuel tank or chamber that it may be used in conjunction with a liquid fuel burner, such as a combustion tube burner, the metering to take place while maintaining a constant fuel level in such tank or chamber so that on the starting of the meter the burner may be operated and continue to be operated from time to time until the predetermined metered quantity of oil has been delivered to the chamber.

These and other objects of the invention will be best understood by the following description when taken in connection with the accompanying illustration of one specific embodiment thereof, while its scope will be more particularly pointed out in the appended claims.

In the drawings:

Fig. 4 is a detail in side elevation, in partial section, illustrating the coin control for the meter;

Fig. 5 is an elevation in section on the line 5—5 in Fig. 2, showing the speed governing mechanism;

Fig. 6 is an elevation, in partial section, showing a modified form of the meter;

Fig. 7 is a detail, in partial section, showing a modified form of the speed governing mechanism; and Fig. 8 is a detail illustrating the actuating device for the meter without coin control.

Figure 1:
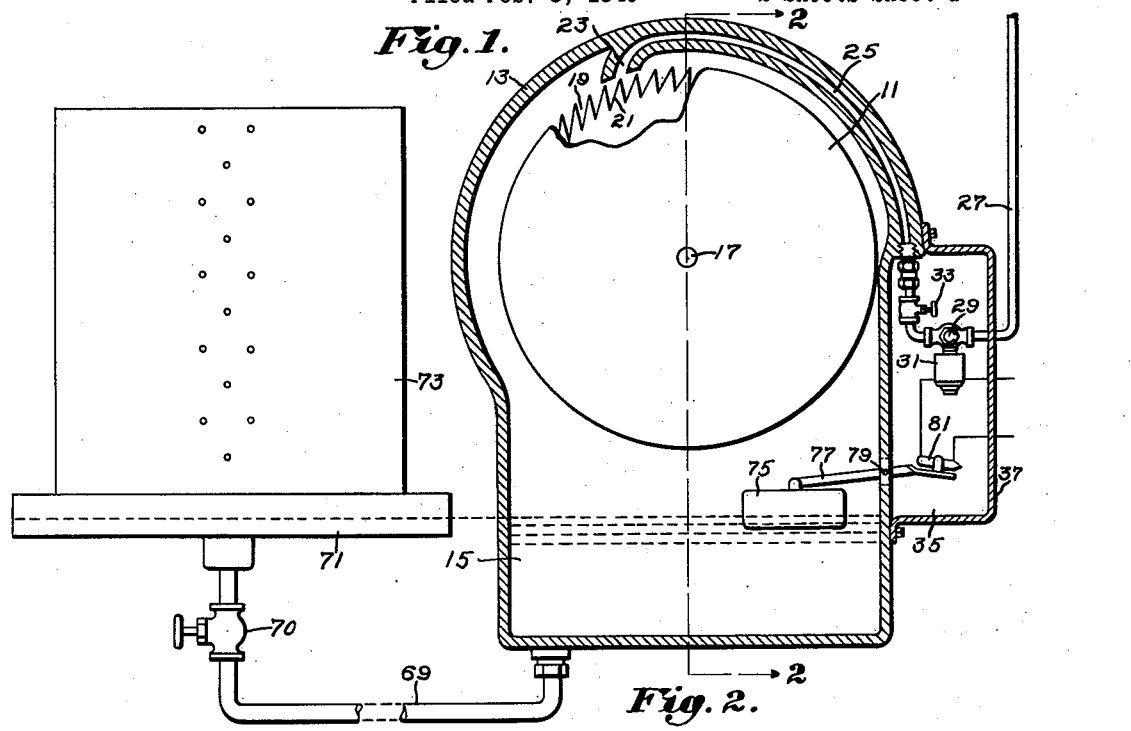
Fig. 1 is a side elevation, in partial section, of a liquid meter embodying one form of the invention and provided with a constant level fuel chamber connected to an oil burner.
Figure 2:
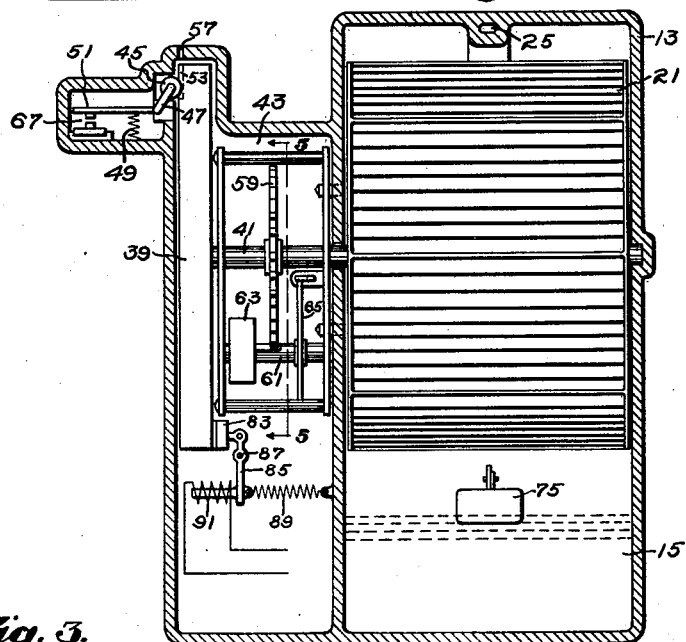
Fig. 2 is a central sectional elevation of the meter on the line 2—2 in Fig. 1.

Referring to the drawings and to the embodiment of the invention shown in Figs. 1 and 2, the meter comprises a rotor 11 constituting a metering device rotatable in the upper cylindrical part of a casing 13, the lower part of which is formed to provide an oil receiving chamber 15. The rotor is mounted on the shaft 17 adapted to turn easily in frictionless bearings in the casing and is provided on its periphery with a succession of closely arranged oil holding pockets or compartments 19 extending completely around the circumference of the rotor and formed by the vaned walls 21, each compartment extending across the width of the rotor.

During the rotation of the rotor the compartments are brought in succession directly beneath the mouth of an oil delivery orifice 23, so that when oil is flowing therefrom the underlying compartment becomes charged with oil. The orifice is so located that oil is delivered to the rotor at an unbalanced position thereof so that the weight of the oil imparts a turning movement to the rotor and the latter is rotatively moved if and when it is free to turn.

Oil is delivered to the orifice 23 through the conduit 25 in the casing 13, which has connection to the feed pipe 27 connected to a source of oil supply maintained at a constant pressure. Such source, for example, may be an elevated supply tank in which a constant level is maintained, as by means of a float control. The starting or stopping of oil delivery through the orifice 23 is controlled by an electro-magnetically actuated valve 29 in the pipe 27, the valve being normally biased to closed position to cut off the delivery of oil but adapted to be opened through the energization of a solenoid magnet 31. The delivery of oil to the rotor preferably takes place in the form of a gentle flow of the oil from the orifice 23, without any substantial impact on the rotor arising from the pressure head, and to maintain such condition an adjustable reducing valve 33 is provided in the pipe 27. The valves 29 and 33 and the magnet 31 are contained within a chamber 35 enclosed by a cover 37 fastened to the casing to prevent unauthorized access thereto.

To control the starting and stopping of the rotor, the latter is connected to a controlling member 39 in the form of a disk directly connected to rotate with the rotor and mounted on an extension 41 of the rotor shaft 17, this disk being located in the chamber 43 separate from but at the side of the rotor and oil chamber. The disk and the rotor are normally both held at rest by a detent 45 comprising a small rotor mounted on an arm 47 of a lever and pressed gently toward the face of the disk by a light spring 49 engaging the other arm 51 of the lever. The detent roller in a given angular position of the disk is adapted to seat in a depression 53 on the peripheral face of the disk and against the walls of such depression so that, when the rotor has moved to bring the depression opposite the detent, the rotor is automatically brought to rest by the detent and there held against further movement until released.

The locking depression 53 in the disk (Fig. 4) forms a pocket of such shape and depth as to hold loosely fitted therein a coin 55 when the latter is inserted through a registering slot 57 in the adjacent overhead wall of the casing. Insertion of the coin forces the roller away from locking engagement with the disk, leaving the latter and the rotor free to turn under the weight of the oil contained in the rotor compartments 19. Under these conditions if the oil is being delivered from the orifice 23, the rotor continues to turn by reason of the oil added to successive compartments, the coin being carried through the path indicated by dotted lines in Fig. 4 and discharged from the disk into the bottom of the compartment 43 in the course of such rotor movement. When the rotor is turned through one complete rotation, the depression 53 is again brought into registration with the roller detent and the latter is moved by the spring 49 to again lock the rotor against further movement until again released.

The disk 39 being directly connected to the rotor, a complete rotation thereof represents one cycle of metering, but, if desired, such a cycle may comprehend two or more rotations of the rotor by providing gearing between the disk and the rotor so that the latter makes two or more rotations for each rotation of the disk. Or, on the other hand, the complete cycle of metering may be represented by a partial rotation of the rotor if two or more locking depressions are provided in the face of the disk.

In order to assure a substantially uniform charge of oil in each of the rotor compartments and the delivery of a predetermined quantity of oil for each revolution of the rotor, means are preferably provided to govern and limit its rate of rotation and prevent an accelerated movement of the rotor through gathering momentum when released. Various means may be employed for this purpose, but herein there is illustrated in Figs. 2 and 5 a conventional clockwork escapement mechanism. This comprises a toothed escapement wheel 59 mounted on the shaft 41 and adapted to be released step by step through the oscillation of the pallet shaft 61. The latter is connected to a balance wheel 63 and a hairspring 65. When the rotor is released and the oil is free to flow from the delivery orifice 23, the weight of the oil turns the rotor, and the rate of oil delivery and the speed of rotation are such that a substantially uniform charge is delivered to each compartment, without overcharge or spilling.

With the release of the control disk 39, the electromagnetically actuated oil valve 29 is simultaneously opened to start the delivery of oil. For this purpose, the magnet 31, together with a suitable source of current, is included in a circuit controlled by a switch 67 operated by the insertion of a coin through the slot 57. The switch comprises a contact carried by the lever arm 51 adapted to engage a second stationary contact such that, when the detent is pressed back to release the disk, the switch is closed but when the detent moves again to lock the disk, the switch is opened. When the rotor is released and starts to turn, the flat face of the disk maintains the detent pressed back and the switch 67 closed until the disk has completed a full revolution and the depression 53 is again brought into registration with the detent.

If the circuit is otherwise intact, the release of the rotor is accordingly accompanied by the opening of the valve 29, the delivery of oil and the initiation of the metering operation, which continues, unless interrupted as hereinafter described, until the rotor has made one full revolution, whereupon it is again locked up, the switch 67 opened, and the oil delivery stopped.

The shape of the oil compartments 19 is such that in the resultant rotation of the rotor they retain their charge for a certain interval, after which it is delivered into the oil chamber beneath.

If the meter is employed for its metering function only, the oil may be promptly withdrawn from the oil receiving chamber and the latter may be of small or inconsequential size, as illustrated in Fig. 6. It may be desirable, however, to allow the oil to accumulate in the chamber, to be withdrawn in partial or fractional amounts therefrom from time to time. In order to avoid the necessity in such cases of an unduly large oil receiving chamber, and correspondingly large dimensions of the metering device as a whole, a relatively small capacity oil chamber is provided in the metering device of Fig. 1 and means are employed to prevent the level of the oil delivered by the rotor from reaching a point where it will interfere with or impede the free movement of the rotor.

In the device illustrated in Fig. 1, moreover, the meter is employed for the double function of metering a predetermined quantity of oil and of maintaining a substantially constant oil level in a chamber connected to feed an oil burner. In the illustrative embodiment of the invention, the bottom of the oil chamber 15 is directly connected through a pipe 69 and valve 70 to the base 71 of an oil burner 73 of the combustion tube type, for the continued operation of which it is desirable that the delivery of the oil to the burner base be maintained under conditions of a constant head or level at the source of supply.

The meter of Fig. 1 is provided with means which maintains such constant level of the metered oil in the oil receiving chamber 15, thereby maintaining the required level for the source of burner supply and at the same time preventing interference between the accumulated oil and the rotor, as above indicated. Such constant level means acts during any cycle of metering to suspend the delivery of oil to the constant level chamber when a given level has been reached but to cause resumption of liquid delivery when the liquid falls below such level.

Figure 3:
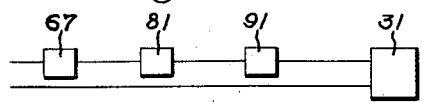
Fig. 3 is a diagram showing the electric controlling circuit.

For this purpose a level responsive device is provided consisting of a float 75 in the oil chamber 15 connected to the lever arm 77 pivoted at 79 and controlling the mercury switch 81, the latter being also enclosed within the chamber 35. The switch 81 is in series in the controlling circuit with the coin controlled switch 67 and the solenoid 31, as indicated in Fig. 3. It is so tilted by the lever 77 that when the float drops below the required position (such as indicated in Fig. 1) the circuit is closed at the switch 81, but when the float reaches such required position the circuit is broken. The result is that when the rotor is released by the insertion of a coin in the slot 57 the delivery of oil starts if the oil level is below that required, but is stopped as soon as the oil reaches the required level and again resumed when the oil level drops, this intermittent starting and stoppage of oil delivery continuing until the rotor has completed its assigned metering cycle.

Means may also be provided to assure stoppage of the rotor when the oil delivery is stopped by the rise of the float and its release when the float again drops. Such means are conventionally illustrated in Fig. 2 and comprise the brake-shoe 83 connected to the lever arm 85 pivoted at 87, the shoe being normally forced against the side of the disk 39 by the spring 89. To release the pressure of the brake-shoe a solenoid magnet 91 is provided, also serially included in the control circuit. Accordingly, when the circuit is closed at both the coin switch 67 and the float switch 81, the brake is moved to release the rotor, but when the circuit is opened at either switch 67 or 81, the brake is applied to stop rotor movement.

In the operation of the combined meter and constant level oil supply chamber, if the user desires to replenish the oil supply for the burner 73, a coin is inserted in the slot, assuring him of a period of burner operation corresponding to a predetermined metered quantity of oil. Where the meter is connected to supply an oil burner, as indicated in Fig. 1, it will customarily be employed from time to time by the same user and a residual amount of oil from the preceding metering operation will ordinarily be present in the oil chamber 15 closely approximating the required level. If the oil chamber, however, is empty, or only partly filled, the float 75 is in a lowered position and the float switch 81 is closed. The insertion of a coin frees the rotor and completes the circuit by closure of the switch 67, this acting to open the oil valve and release the brake 83. The rotor then turns and continues to deliver oil to the chamber 15 until the oil level has reached the required stage, whereupon the float switch 81 opens, closing the oil valve and applying the brake 83. Further movement of the rotor and further delivery of the oil is then interrupted. The burner may then be lighted and oil will be available for its operation until the quantity of oil called for by the coin inserted has been supplied to the oil chamber, the metering operation by the rotor being alternately suspended and resumed as the oil level rises above or falls below the assigned point. When the amount of oil called for by the coin has been delivered to the oil chamber, the rotor becomes automatically locked and the oil delivery stopped until the meter is again started by the insertion of another coin. If the operation of the burner is stopped at any time by shutting off the oil supply through the valve 70 before the metering cycle has been completed, the latter will be again resumed after the burner has again started into operation.

If the device is to be employed for its metering function alone, unconnected with an oil burner, and the metered oil or other liquid is to be discharged directly into a removable container, a continuous uninterrupted metering operation may take place and the construction may be simplified by the omission of the float 75, float switch 81 and the magnetic brake 91. Such a simplified construction is illustrated in Fig. 6, where the arrangement and functioning of the meter is substantially the same as already described, except as to the presence and functioning of the parts indicated as absent. In this case, as before, the insertion of the coin serves to release the rotor, close the control circuit, and open the oil valve, the rotor continuing to turn without interruption until the metering cycle is completed, the liquid passing to the bottom of the chamber, where it is withdrawn through the valve outlet 93 into the container 95.

In Fig. 7 there is shown a meter substantially as illustrated in Figs. 1 and 2, but provided with a simplified form of device in place of the clockwork escapement for governing the speed of the rotor. In this case the shaft 97 connecting the rotor 11 and the control disk 39 serves to turn a retarding device or stabilizer 99 in the rotor chamber, the latter consisting of a shaft carrying at its lower end two or more vanes or blades 101 which are immersed in the oil in the chamber 15 and are turned with the rotor by a gearing connection. The latter herein consists of a worm gear drive, the worm 103 being carried by the shaft 97. The resistance to movement of the blades in the liquid serves to check any tendency for acceleration in the rotary movement of the rotor and to govern and limit the rotative speed thereof.

The initial actuation of the meter has been described as taking place through the insertion of a coin in the slot 57, since its use as a prepayment meter opens a new and wide field of utility, particularly in dwellings and apartments where a central supply of oil is available and ready to be drawn on under prepayment conditions. Actuation by other means than prepayment, however, may be employed, in which case the meter may be provided with recording dial mechanism which will show the quantity of liquid delivered by recording the number of rotations made by the rotor. Such actuation, for example, may be effected by the mechanism illustrated in Fig. 8 in which the detent is moved to a rotor-releasing position by a push-button 105 normally held away from the lever 51 by the spring 107. In this case the coin slot is absent and the disk-shaped detent 109 seats in a correspondingly shaped depression 111 in the side of the control disk.

While I have herein shown and described for the purposes of illustration one specific embodiment of the invention and one specific application thereof, it is to be understood that extensive deviations may be made in the form, construction and relative arrangement of parts, and that the metering device may be employed for metering various liquids other than oil or other liquid fuel, all without departing from the spirit of the invention.

1. A combined oil meter and constant level feeding tank for supplying a combustion tube burner, having an oil chamber, a metering device comprising a rotor having circumferential oil holding compartments, means for delivering oil to said compartments in succession in an unbalancing position to effect a rotation of the rotor and a metered delivery of oil to said chamber, means normally preventing turning movement of the rotor but operable to release the same for turning through a predetermined range of movement and adapted to stop and lock the same on completion of such movement, electro-magnetically actuated valve means to start and stop the oil delivery, an electric circuit the closure of which acts to open the valve means and the opening of which acts to close the valve means, means actuated by the release of said rotor to close said circuit and by the completion of said predetermined range to open said circuit, means, effective until a predetermined quantity of oil has been delivered to said chamber, to maintain therein a substantially constant oil level but acting to suspend the delivery of oil thereto when a given oil level has been reached in such chamber, the same comprising a float member in said chamber, and a circuit controlling device actuated by said float to open said circuit when the oil reaches said level and to close the same when the oil drops below said level.

2. A liquid meter having, in combination, a liquid receiving chamber, a metering device comprising a gravity actuated rotor having liquid holding compartments for delivering liquid from a source of liquid supply to said chamber, releasable means normally locking said rotor against rotation and adapted when released to move automatically again into engaging position upon predetermined rotation of said rotor, valve means for controlling delivery of liquid to said rotor, means for automatically opening said valve means when said releasable means is moved to released position and for automatically closing it when said releasable means is moved to engaged position, and means operable only when said releasable means is in released position for opening and closing said valve means in response to the level of the liquid in said chamber for maintaining said level substantially constant while it is being metered.

3. A combined oil meter and constant level oil tank for feeding oil to the oil chamber of a combustion tube burner, a metering device for delivering a predetermined quantity of oil to said tank, a valve for establishing and interrupting flow of oil to said device; means controlled by the level of oil in said tank, effective until such predetermined quantity has been delivered thereto, for actuating said valve for maintaining a substantially constant level of oil in said tank whereby to cause a substantially uniform flow of oil to the chamber, and means actuated by said device upon its metering such quantity of oil for closing said valve independently of the level of oil in said tank.

4. A combined oil meter and constant level oil tank for feeding oil to the oil chamber of a combustion tube burner, a metering device for delivering a predetermined quantity of oil to said tank, means for rendering said device in condition for operation to deliver said predetermined quantity of oil, and means responsive to the level of the oil in said tank operative only when said device is in such condition for maintaining such level substantially constant.

5. A liquid metering device comprising a gravity actuated rotor having circumferential liquid holding compartments, means for delivering liquid to said compartments in succession at an unbalancing position to effect a rotation of the rotor and a metered delivery of the liquid thereby, an electro-magnetically actuated valve to start and stop said delivery, a detent normally preventing turning movement of the rotor operable to release the latter but to automatically stop it after turning through a predetermined range of movement, a normally open electric circuit the closure of which opens said valve, circuit controlling means actuated by the releasing movement of the detent to close said circuit, and circuit controlling means operable to open the circuit on completion of said predetermined range.

6. A liquid metering device comprising a gravity actuated rotor having circumferential liquid holding compartments, means for delivering liquid to said compartments in succession at an unbalancing position to effect a rotation of the rotor and a metered delivery of the liquid thereby, an electro-magnetically actuated valve to start and stop said delivery, starting means normally preventing turning movement of the rotor operable to release the latter but to automatically stop it after turning through a predetermined range of movement, an electric circuit controlling said valve, and circuit controlling means actuated on the release of said rotor to open said valve and on the completion of said predetermined range to close the same.

7. A liquid metering device comprising a gravity actuated rotor having circumferential liquid holding compartments, means for delivering liquid to said compartments in succession at an unbalancing position to effect a rotation of the rotor and a metered delivery of liquid thereby, a valve to control said liquid delivery, means to actuate said valve to start and stop said liquid delivery, and means for governing and limiting the rate of rotation of said rotor, said means comprising an escapement mechanism connected to said rotor.

8. A liquid metering device comprising a gravity actuated rotor having circumferential liquid holding compartments, means for delivering liquid to said compartments in succession at an unbalancing position to effect a rotation of the rotor by gravity only and a metered delivery of liquid thereby, a valve to control said liquid delivery to said compartments, means to actuate said valve to start and stop said liquid delivery, and means operated by rotation of the rotor for governing the rate of rotation of said rotor.

9. A combined oil meter and constant level oil tank for feeding oil to the oil chamber of a combustion tube burner, a metering device comprising a rotor having circumferential oil holding compartments, means for delivering oil in succession to said compartments in an unbalancing position to effect rotation of the rotor and a metered delivery of oil to the chamber, releasable positive locking means normally preventing turning movement of the rotor but operable to release the same for turning through a predetermined range of movement and adapted to lock the same on completion of such movement, valve means to start and stop oil delivery, means actuated by the release of said rotor by said locking means to open the valve means and on the completion of such range of movement to close the same, and means responsive to a given oil level in the oil tank for closing said valve means to suspend the delivery of oil to the rotor and the metering operation when said level is reached but to resume such delivery and the metering operation when the oil falls below such level, whereby a predetermined metered quantity of oil is delivered while maintaining a substantially constant oil level in said tank.

10. A combined oil meter and constant level oil tank for feeding oil to the oil chamber of a combustion tube burner, a metering device comprising a rotor having circumferential oil holding compartments, means for delivering oil in succession to said compartments in an unbalancing position to effect rotation of the rotor and a metered delivery of oil to the chamber, releasable positive locking means normally preventing turning movement of the rotor but operable to release the same for turning through a predetermined range of movement and adapted to lock the same on completion of such movement, valve means to start and stop oil delivery, means actuated by the release of said rotor by said locking means to open the valve means and on the completion of such range of movement to close the same, means responsive to a given oil level in the oil tank for closing said valve means to suspend the delivery of oil to the rotor and the metering operation when said level is reached but to resume such delivery and the metering operation when the oil falls below such level, and means for automatically locking said rotor against rotation when the oil delivery is so suspended and automatically releasing it to permit it to rotate further when said delivery is resumed.

11. A liquid metering device comprising a gravity actuated rotor having circumferential liquid holding compartments, means for delivering liquid to said compartments in succession at an unbalancing position to effect a rotation of the rotor and a metered delivery of the liquid thereby, a valve to start and stop said delivery, starting means normally preventing turning movement of the rotor operable to release the latter but to automatically stop it after turning through a given range of movement, means actuated by the release of said rotor to open said valve and start liquid delivery but on the completion of said predetermined range to close the valve, and means for governing and limiting the rate of rotation of the rotor thereby to prevent an accelerated movement of the latter and assure a uniform charge of liquid in each of said holding compartments.

12. A liquid metering device comprising a gravity actuated rotor having circumferential liquid holding compartments in succession at an unbalancing position at such rate as to effect the rotation of the rotor by gravity only and a metered delivery of the liquid thereby, a valve to start and stop said delivery, releasable means normally preventing turning movement of the rotor operable into released position to release the latter and operable automatically into engaged position to stop it after turning through a predetermined range of movement, and means actuated in response to movement of said releasable means into released position to open said valve and start liquid delivery and in response to movement of said releasable means into engaged position to close said valve.

RALLSTON M. SHERMAN.